(12) United States Patent
Viola et al.

(10) Patent No.: US 10,428,703 B2
(45) Date of Patent: Oct. 1, 2019

(54) MACHINE LUBRICANT ADDITIVE DISTRIBUTION SYSTEMS AND METHODS

(71) Applicant: GM GLOBAL TECHNOLOGY OPERATIONS LLC, Detroit, MI (US)

(72) Inventors: Michael B. Viola, Macomb Township, MI (US); Eric W. Schneider, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 43 days.

(21) Appl. No.: 15/653,581

(22) Filed: Jul. 19, 2017

(65) Prior Publication Data
US 2019/0024543 A1 Jan. 24, 2019

(51) Int. Cl.
| | |
|---|---|
| F01M 9/02 | (2006.01) |
| F01M 11/00 | (2006.01) |
| F01M 11/04 | (2006.01) |
| F16N 39/06 | (2006.01) |
| F01M 11/03 | (2006.01) |
| F01M 11/10 | (2006.01) |

(52) U.S. Cl.
CPC .......... *F01M 9/02* (2013.01); *F01M 11/0004* (2013.01); *F01M 11/03* (2013.01); *F01M 11/0458* (2013.01); *F01M 11/10* (2013.01); *F16N 39/06* (2013.01); *F01M 2011/0033* (2013.01)

(58) Field of Classification Search
CPC .. F01M 9/02; F01M 11/0004; F01M 11/0458; F01M 2011/0033; F16N 39/06
USPC .................. 210/416.5; 73/114.55, 290 R
See application file for complete search history.

(56) References Cited

U.S. PATENT DOCUMENTS

| | | | |
|---|---|---|---|
| 4,075,098 A * | 2/1978 | Paul .................. | B01D 27/08 210/167.02 |
| 4,888,122 A * | 12/1989 | McCready .......... | C10M 161/00 508/165 |
| 6,045,692 A | 4/2000 | Bilski et al. | |
| 7,417,012 B2 | 8/2008 | Burrington et al. | |
| 2005/0019236 A1 | 1/2005 | Martin et al. | |
| 2006/0254986 A1 | 11/2006 | Hanson et al. | |
| 2010/0228400 A1* | 9/2010 | Johnson .................. | F01M 9/02 700/283 |
| 2012/0080384 A1* | 4/2012 | Reinosa ............... | B01D 27/103 210/695 |
| 2012/0325752 A1* | 12/2012 | Baldwin, Jr. ........ | B01D 35/153 210/742 |
| 2013/0146009 A1 | 6/2013 | Pederson et al. | |
| 2013/0199983 A1* | 8/2013 | Patel ...................... | F01M 9/02 210/209 |
| 2013/0248292 A1 | 9/2013 | Mordukhovich et al. | |

(Continued)

*Primary Examiner* — Syed O Hasan
(74) *Attorney, Agent, or Firm* — Quinn IP Law

(57) ABSTRACT

A lubrication system in a machine includes a sump to collect a bulk portion of lubricant and a pump adapted to circulate the lubricant from the sump through a lubricant line to an area of the machine for lubrication. The lubrication system also includes an oil filter disposed along the lubrication line adapted to filer the lubricant flowing through the lubricant line. The lubrication further includes an additive fixture in fluid flow communication with the oil filter adapted to house at least one additive material section and distribute the additive material in a lubrication flow circulation.

19 Claims, 5 Drawing Sheets

(56) References Cited

U.S. PATENT DOCUMENTS

2014/0246380 A1* 9/2014 Rohrbach ............ B01D 35/005
210/748.16

* cited by examiner

MACHINE LUBRICANT ADDITIVE DISTRIBUTION SYSTEMS AND METHODS

TECHNICAL FIELD

The present disclosure relates to providing additive components to a lubricant circulation system for a machine.

INTRODUCTION

Lubrication circulation systems such as for a combustion engine or other machine may be arranged to receive the addition of friction modifiers or other additives to enhance the performance of the lubricants over the life of the machine. Over time the friction modifiers applied to the lubricant can become depleted resulting in greater friction, and in the case of a vehicle engine lead to reduced fuel economy.

SUMMARY

A lubrication system in a machine includes a sump to collect a bulk portion of lubricant and a pump adapted to circulate the lubricant from the sump through a lubricant line to an area of the machine for lubrication. The lubrication system also includes an oil filter disposed along the lubrication line adapted to filer the lubricant flowing through the lubricant line. The lubrication further includes an additive fixture in fluid flow communication with the oil filter adapted to house at least one additive material section and distribute the additive material in a lubrication flow circulation.

A method of dispensing additive material to a lubricant includes circulating a lubricant through a machine and providing a lubricant filter in a lubricant fluid circuit to filter a contaminant from the lubricant. The method also includes providing an additive fixture along the lubricant fluid circuit to distribute an additive material to modify a chemical property of the lubricant. The method further includes monitoring at least one lubricant property. The method further includes generating a signal indicative of a need to replenish the additive material in response to the lubricant property exceeding a predetermined threshold.

An engine for a motor vehicle includes at least one combustion cylinder within a cylinder block and a reciprocating piston arranged to cycle within each of the combustion cylinders to generate an engine torque. The engine also includes a lubrication system arranged to circulate a lubricant about components of the cylinder block and an oil filter in fluid flow communication with the lubrication system. The engine further includes an additive fixture disposed between the oil filter and the lubrication system, wherein the additive fixture houses at least one additive material segment in contact with a lubricant flow.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
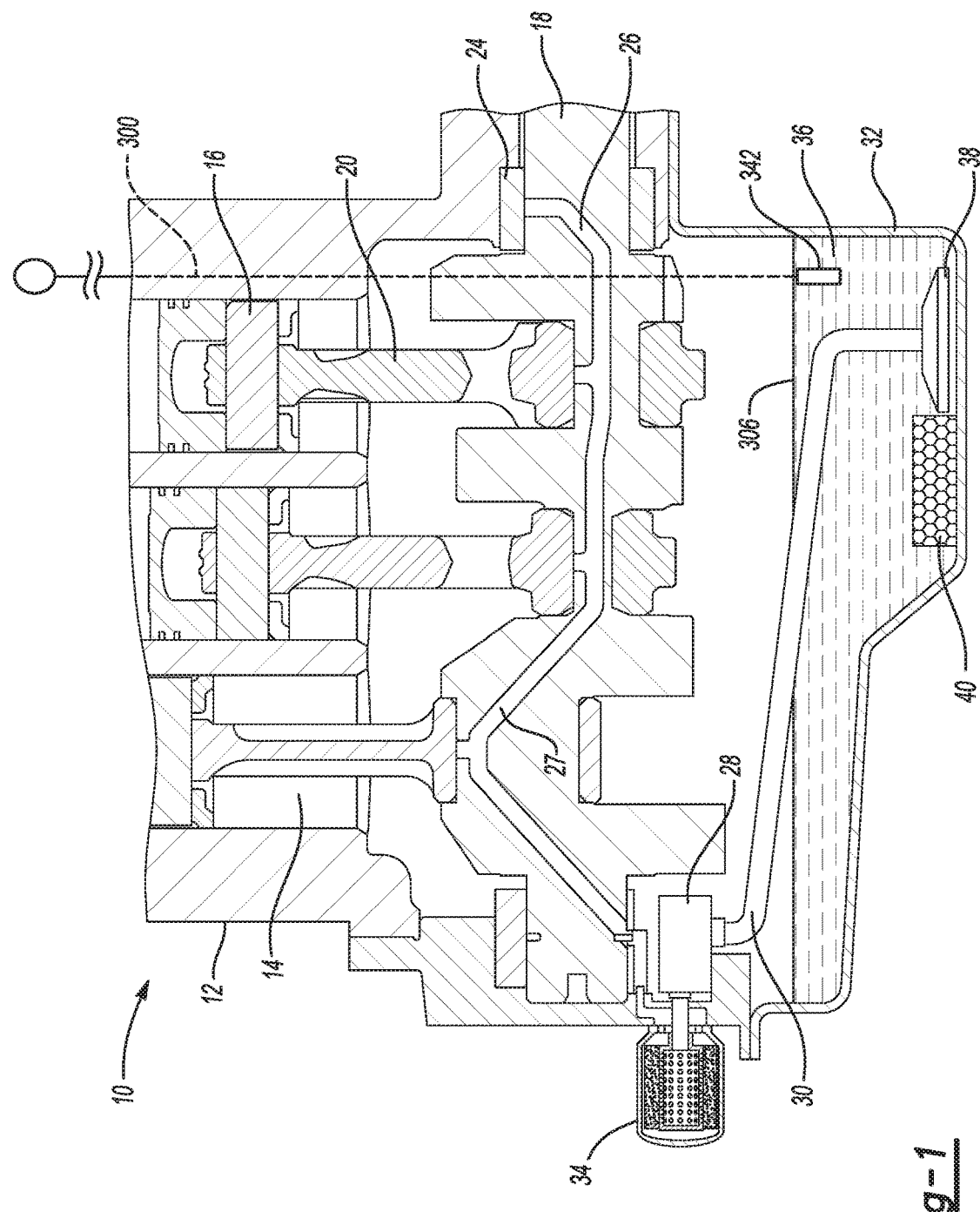
FIG. 1 is a schematic, partial cross-sectional illustration of an engine for a motor vehicle having a lubrication system.

Referring to FIG. 1, a vehicle internal combustion engine 10 includes a cylinder case 12 defining a plurality of cylinders 14, each arranged to house a piston 16 for reciprocal motion therein. Each piston 16 imparts torque to a crankshaft 18 via a connecting rod 20 as a result of force generated by combustion of an air-fuel mixture inside each respective cylinder 14. Each connecting rod 20 is rotationally supported on the crankshaft 18 via a rod bearing 22. The crankshaft 18 is rotationally supported in the cylinder case 12 via main bearings 24.

The engine 10 employs a lubrication system 26 having passages or fluid galleries 27 for supplying oil to rod bearings 22, main bearings 24, and other moving parts (not shown). The fluid passages of lubrication system 26 are supplied with oil 36 via an oil pump 28, which first pumps the oil through an oil filter 34. The oil filter 34 includes filter media that strains particulates and other contaminants from lubricant circulating through the filter. The oil pump 28 employs a receiving structure 30 projecting from the pump 28, which may conclude with a steel mesh screen 38 to filter out debris, for receiving oil from an oil pan sump 32. The sump 32 may also contain a molecular sieve structure 40, which is attached to sump 32 so as not to interfere with operation of the engine. In the example of FIG. 1, the molecular sieve structure 40 is formed in the shape of a rectangular brick and is affixed to a bottom portion of the sump 32. In other examples (not shown), the sieve structure 40 may have other shapes or may be of different sizes relative to the sump 32. In some examples, the sieve structure may substantially fill the sump. The sieve structure may also be embedded as multiple nodules in another material such as a foam or contained in a porous enclosure.

Lubricant additive mechanisms may be disposed along various parts of the engine lubrication system 26 instead of or in addition to being located in the sump 32. For example, the sieve structure may be configured to continuously and/or periodically release additive material for distribution throughout lubricant flowing through fluid passages 27 of the lubrication system 26. The additive material is formulated to chemically modify at least one physical property of lubricant flowing within the engine 10. One common additive material type is a friction modifier to improve lubricity of the engine oil. The friction modifier reduces overall engine friction and improves fuel economy. Over time, friction modifier applied to the engine oil can become depleted resulting in greater friction and reduced fuel economy. In alternate examples, other types of additives may be introduced to modify engine oil aeration, anti-foam, antioxidant, and/or anti-wear properties.

Additive materials may be applied to the engine oil at various locations along the lubrication circulation system. In some examples, one or more lubricant additive mechanism may be located in a separate fluid loop added to the lubrication system to contain and release the additive material. More specifically, additives may be inserted at the sump area, for example distributed from sieve structure 40. In such cases, this presents an additional, separate maintenance locations because users may not otherwise have a regular need to access components at the sump area for service. Comparatively, the oil filter requires periodic service and replacement as part of a normal vehicle maintenance schedule. Thus there may be advantages to integrating the lubricant additive dispersion to a regularly serviced component, such as the oil filer for example.

A mechanism to introduce one or more engine oil additive materials, without significant engine hardware changes may serve to enhance simplicity and reduce costs of the lubrication system. In some examples, the devices and methods presented herein are backward compatible with standard oil filtration system interfaces.

A distribution mechanism may be strategically connected to an adapter portion disposed on the oil filter 34 to hold and distribute the additive material to engine oil circulating through the oil filter 34.

Figure 2:
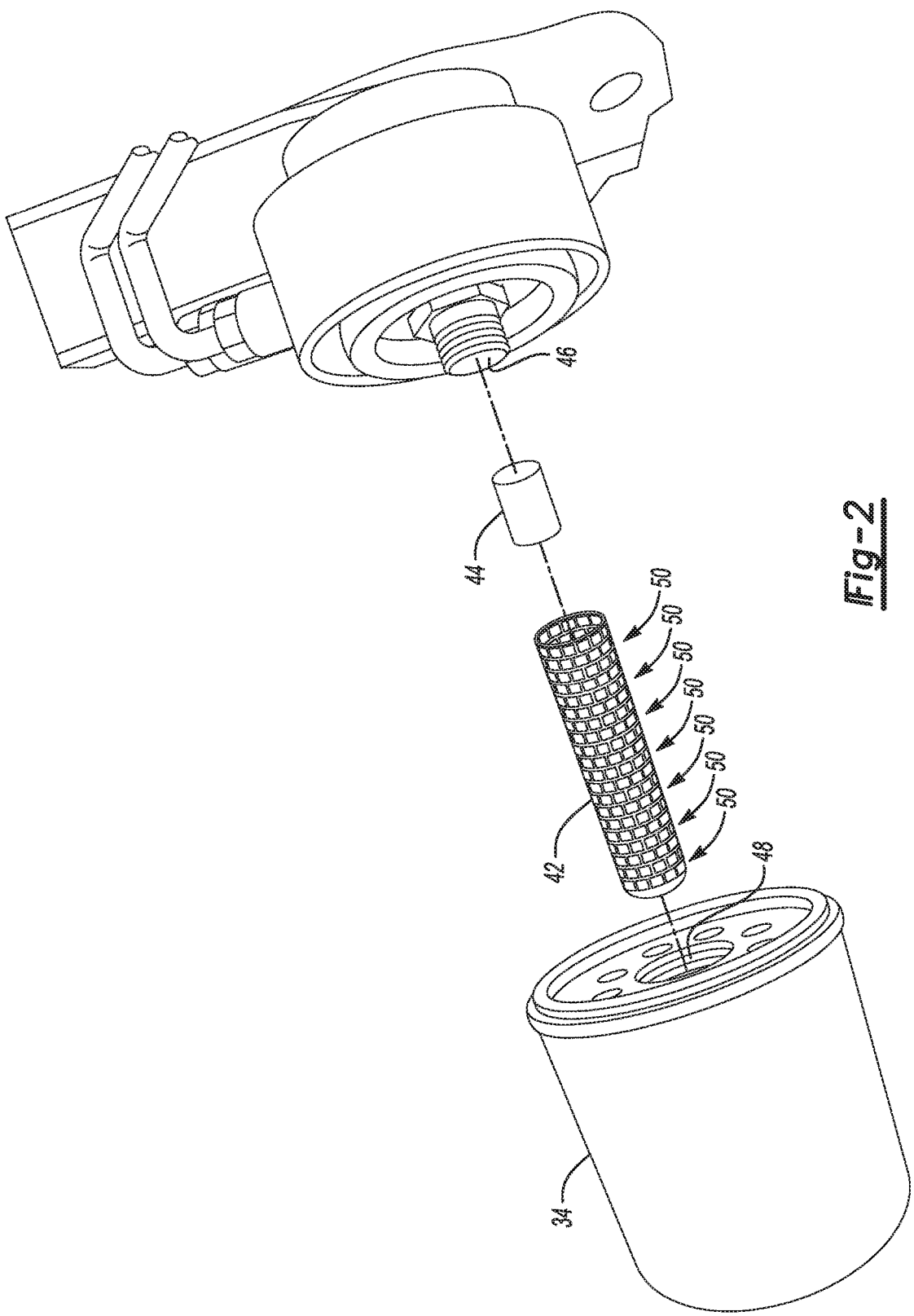
FIG. 2 is an exploded view of a lubrication additive material distribution system according to an example.

Referring to FIG. 2, a fixture 42 is provided which holds and releases an additive 44 into a fluid circuit of the engine oil. Strategic placement of fixture 42 that screws into the oil filter block adapter 46 as an additive material housing allows a friction modifier (or other type of engine oil addition) to be distributed to oil which passes through the oil filter 34. As discussed above, the additive material 44 may be provided as solid pellets, a fluid or gel volume directly within the fixture, a gel pack, a capsule, a powder, or other medium suitable to dissolve and release the desired chemicals through oil circulating in the lubrication system.

The oil filter 34 includes a standard interface 48 which is sized to accept the fixture 42 into an internal portion of the oil filter 34 and screw into the engine oil filter block adapter 46 as usual. According to some examples the standard interface 48 is threaded to correspond to a mating threaded portion of the filter block adapter 46. The fixture 42 may be a screen basket configuration formed from stainless steel or other material capable of handling oil temperatures and material compatibility. Apertures 50 are disposed about the basket and allow for flow through the basket as lubricant circulates about the oil filter 34. One or more deposits of additive material 44 may be inserted into the fixture 42 prior to installing the oil filter 34. Thus, during an oil change, a new oil filter may be fitted with the fixture and accompanying additive material to modify a property of lubricant circulating therethrough. Subsequent flow of oil through the oil filter will gradually dissolve the additive material, distributing it into the bulk oil.

Different types of additive materials may be introduced according to the particular lubricant enhancement which is desired. As discussed above, a friction modifier may be introduced to reduce wear of internal engine component and improve fuel economy. In other examples, the additive material may include antioxidants to reduce lubricant breakdown and extend oil life. The antioxidant additives retard the degradation of the stock oil by oxidation. In further examples, the additive material may include anti-foamant properties to reduce foaming and oil aeration. Thus a particular type of additive material 44 may be selected to solve problems tailored to a specific engine.

According to some examples, the fixture 42 may be fitted with a segment of additive material 44 and affixed to the block adapter 46 prior to installation of the oil filter 34. In such cases the fixture 42 may be formed from a flexible material to enable the oil filter 34 to be installed from an angle thereby easing installation. Also, additional filter media may be provided within the housing 42 to further inhibit debris from entering the engine. In such cases a portion of the filter media which would otherwise be in the oil filter may be removed from the filter to maintain a similar level of lubricant fluid back pressure.

Figure 3:
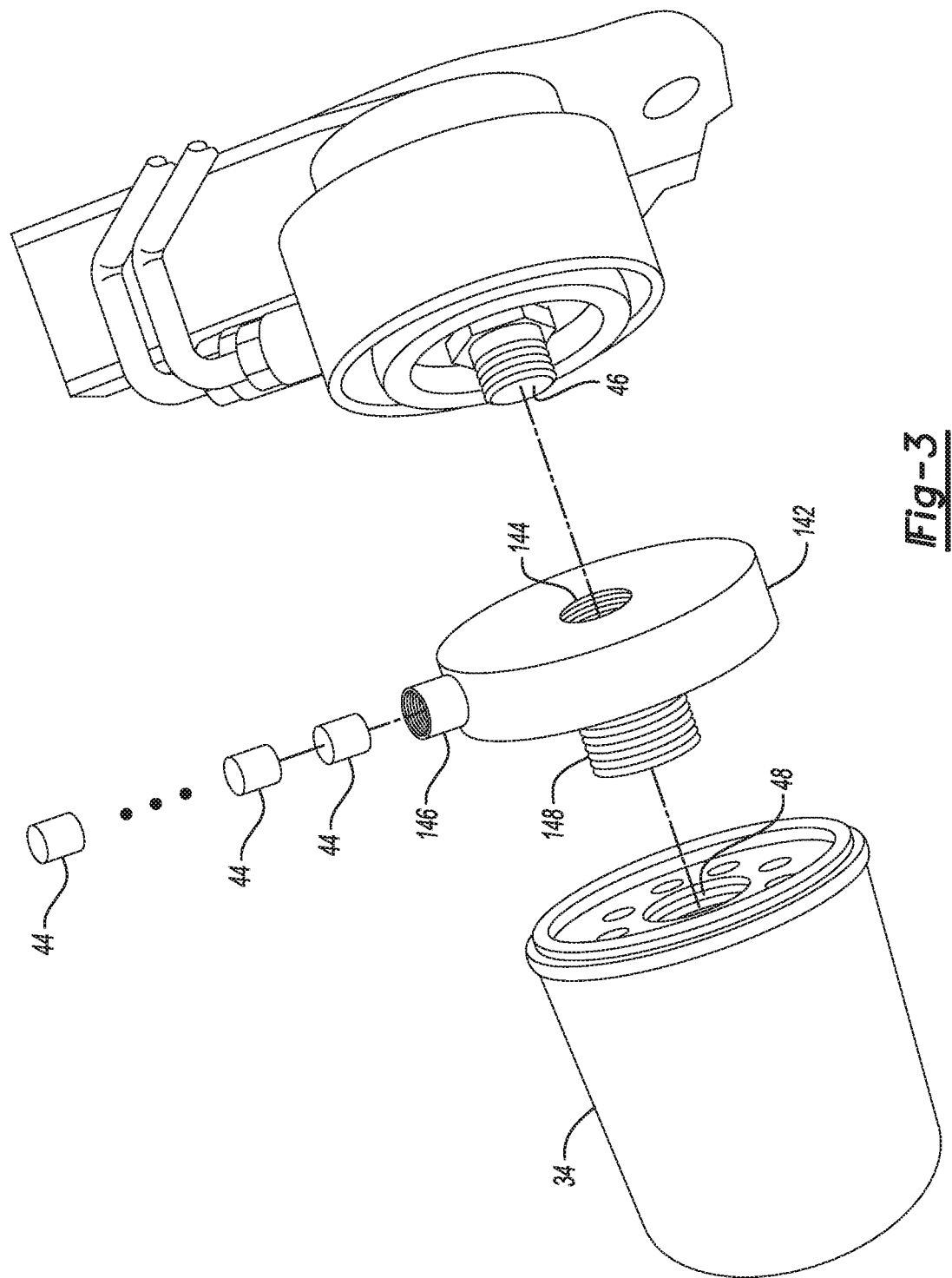
FIG. 3 is an exploded view of a lubrication additive material distribution system according to a second example.

Referring to FIG. 3, an alternate example placement is provided for a fixture 142 to house and distribute additive material 44. The fixture 142 is adapted to screw onto the oil filter block adapter 46 and holds the friction modifier or other type of engine oil additive. A first circulation port 144 may include a threaded portion to secure onto a corresponding threaded portion of the oil filter block adapter 46. The first circulation port 144 allows the fixture 142 to be in fluid connection with a lubricant passage of the cylinder block. An internal cavity of the fixture 142 is sized to contain one or more sections of additive material 44. The internal portion may include one or more veins or other fluid directing features to cause a predetermined flow pattern of lubricant passing through the fixture. In one example the internal portion induces a spiral flow pattern terminating at a second circulation port in fluid connection with the oil filter 34. The fluid directing features may be configured to cause a desirable volume flow of lubricant to come into contact with the sections of additive material 44 so as to dissolve the additive chemical and supply it to the bulk oil volume at the desired rate. According to a specific example, the internal cavity of the fixture 142 comprises a swirl chamber to circulate lubricant fluid flow about one or more sections of additive material.

An insertion port 146 is provided to allow insertion of sections of additive materials into the internal cavity of the fixture 142. In some examples, one or more replacement sections may be inserted at a timing according to a lubrication system service schedule, or for example, once the previously-inserted sections have been depleted. A cap (not shown) may be provided to create a fluid seal once the fixture 142 is installed and the additive material sections 44 are inserted into the internal cavity.

The oil filter 34 includes a standard interface 48 as discussed above and is arranged to screw onto the fixture 142. A protrusion portion 148 may include an external threads to retain the standard interface 48 of the oil filter 34 and create a fluid seal. The arrangement of the fixture 142 is such that it may be retroactively applied to an existing vehicle using a standard interface and oil filter components. Thus certain additives may be applied to a lubricant of a vehicle according to the particular physical state and operating conditions of the engine. In some alternative examples, the fixture 142 is configured to be disposable and thus replaced as part of a maintenance schedule with a new fixture having a replenished supply of additive materials.

Figure 4:
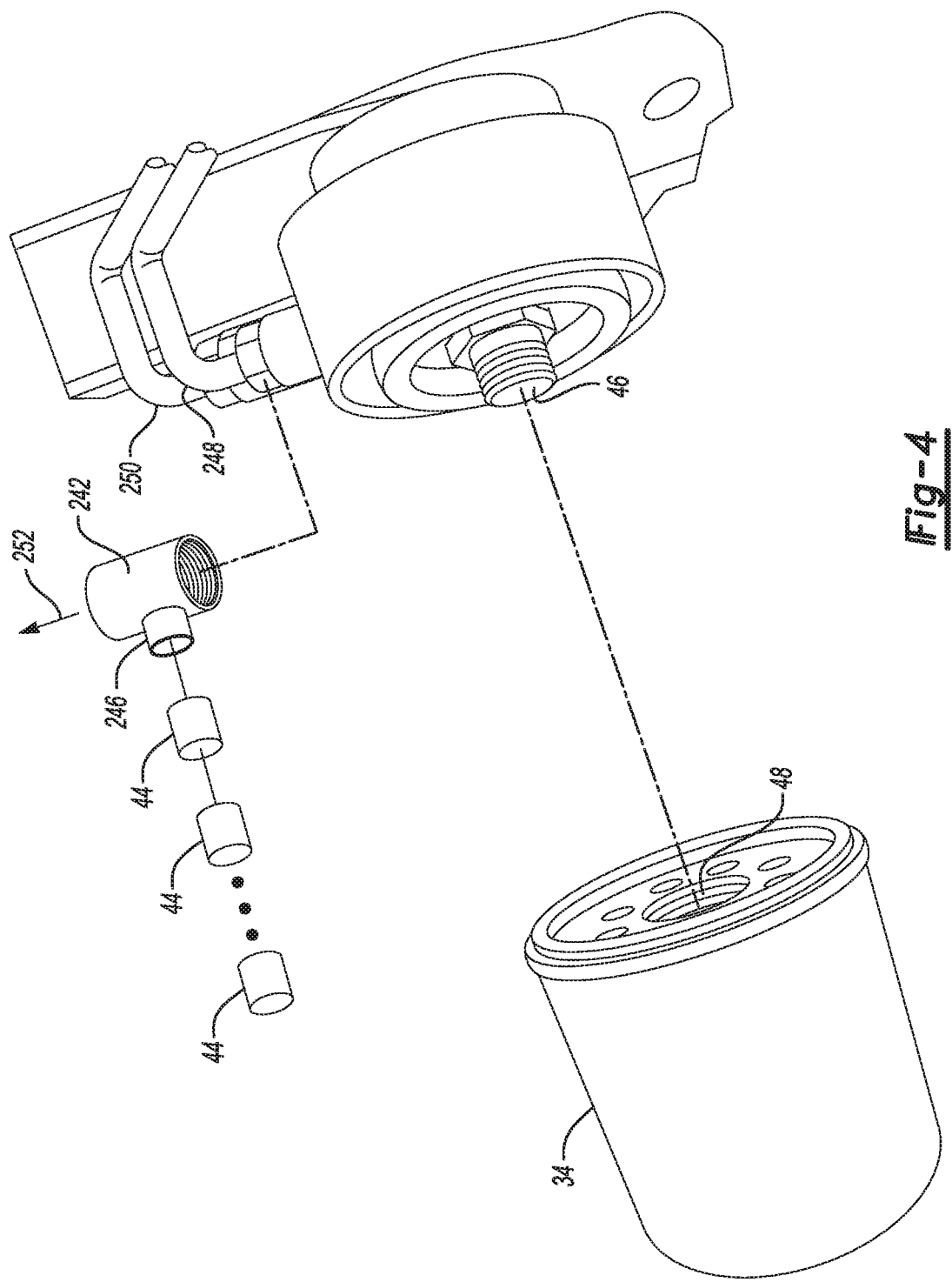
FIG. 4 is an exploded view of a lubrication additive material distribution system according to a third example.

Referring to FIG. 4, a further example fixture 242 is provided which is arranged to be in-line with respect to an oil flow line 244. The fixture 242 itself may be configured for periodic replacement, or be permanently installed where sections of additive material 44 may be inserted without breaking the oil flow line. A first oil flow line may be a circulation line 248 which circulates lubricant toward the oil filter 34 for conditioning. A second oil flow line may be an engine supply line 250 which provides lubricant to the engine following filtration at the oil filter 34. According to some examples the fixture 242 is located along the supply line 250 downstream of the oil filter 34 relative to a direction 252 of fluid flow. In this way, additive material may be added to the lubricant following filtration by the oil filter as it is supplied back to the engine. In certain alternative examples, the particular additive material may be configured to enhance filtration by the oil filter. In such cases the fixture 242 may be located upstream of the oil filter along circulation line 248 such that the additive material is applied to the lubricant prior to entry into the oil filter 34.

The fixture 242 includes an insertion port 246 to allow insertion of additive materials 44 similar to previous examples. While the examples depicted include pellets or gel packs, alternative forms of additive materials may be applied to the fixture 242. More specifically, a supply tube (not shown) may be connected to the insertion port 246 such that a fluid, solid, or semisolid additive material is fed to the fixture 242 to replenish the additive material. The additive material may be contained within an internal cavity of the fixture 242 and released over time into the bulk oil. In other examples, the material may be immediately applied to the bulk oil volume. The inline fixture 242 may alternatively be located at a location along the lubrication circulation system such that the additive is provided directly to a lubricant fluid gallery 27 of the engine block.

Figure 5:
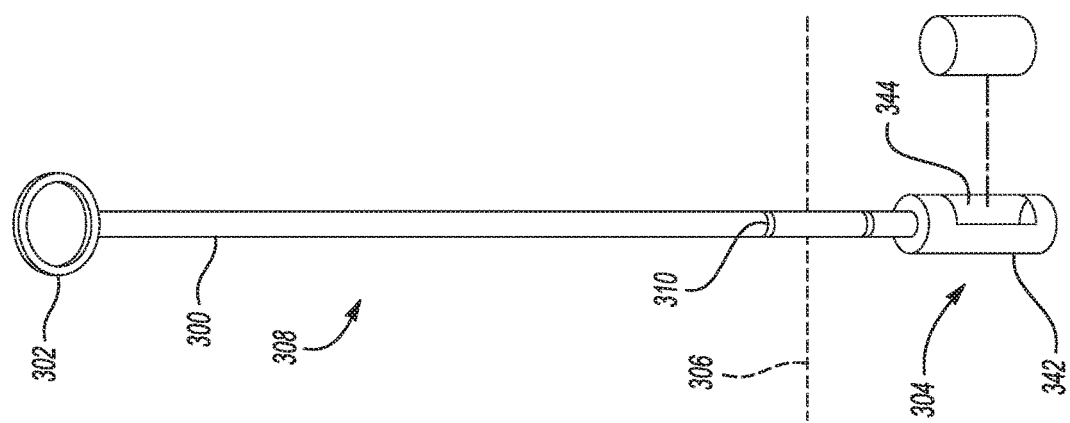
FIG. 5 is an exploded view of a lubrication additive material distribution system according to a fourth example.

Referring to FIG. 5, an additional example fixture is provided for distributing oil additive materials. A dip stick 300 is used to indicate an oil level measurement and provide a means for assessing oil aging. As is known for conventional vehicles, the dip stick 300 includes a handle portion 302 at a first end which protrudes from a top area of the engine. The dip stick 300 also includes a lower portion 304 at a second end that extends down to a sump portion of the engine where a bulk portion of the lubricant is collected. The lower portion 304 is located below a top level 306 of the collected fluid within the oil sump. Due to the viscosity of the lubricant, a middle portion 308 between the first end and the second end of the dip stick retains some of the oil in which it comes into contact when the dip stick 300 is removed from the engine. One or more lubricant level indicators 310 are provided along the dip stick to provide a visual indication of the level and quality of the lubricant.

An additive fixture 342 is coupled to the second end of the dip stick such that when the dip stick 300 is inserted, at least a portion of the fixture 342 is submerged below the top level 306 of the oil. The fixture may be attached to the end of the dip stick by threading or other mechanical attachment methods. The additive fixture 342 may be separable from a terminal end of the dipstick and configured to be periodically replaced such as at times when the bulk oil is serviced and filter changed. In some examples, the additive fixture 342 is disposable such that each time the oil is changed, a first additive fixture is removed and a second replacement additive fixture is applied to replenish the additive material. A replacement fixture may be included as part of a service component package. The dip stick configuration may allow a user to visually see a quantity of additive remaining at the additive fixture 342. Thus a user may add various additive materials to condition the lubricant mid-cycle according a depletion rate of a previously inserted additive material section. Such strategic placement of additive materials such as engine oil friction modifier in a small container attached to the end of the dip stick also provides an advantage with respect to ease of service. The additive fixture is thus conveniently accessible, removable, and replaceable. That is, additive may be conveniently added without having to access an undercarriage of the vehicle.

Similar to previous examples, additive materials are contained in an internal cavity of the additive fixture 342 and are distributed to the bulk oil as the lubricant is circulated about the fixture 342. The additive fixture 342 includes a outer cage portion 344 to house a pellet or gel capsule within the internal cavity. The body of the additive fixture 342 may include mesh portions, perforations, or other features to allow lubricant to flow through the body during engine operation and come into contact with the additive material section. Thus the outer cage allows fluid communication of the lubricant between the internal cavity and the bulk portion of lubricant.

Figure 6:
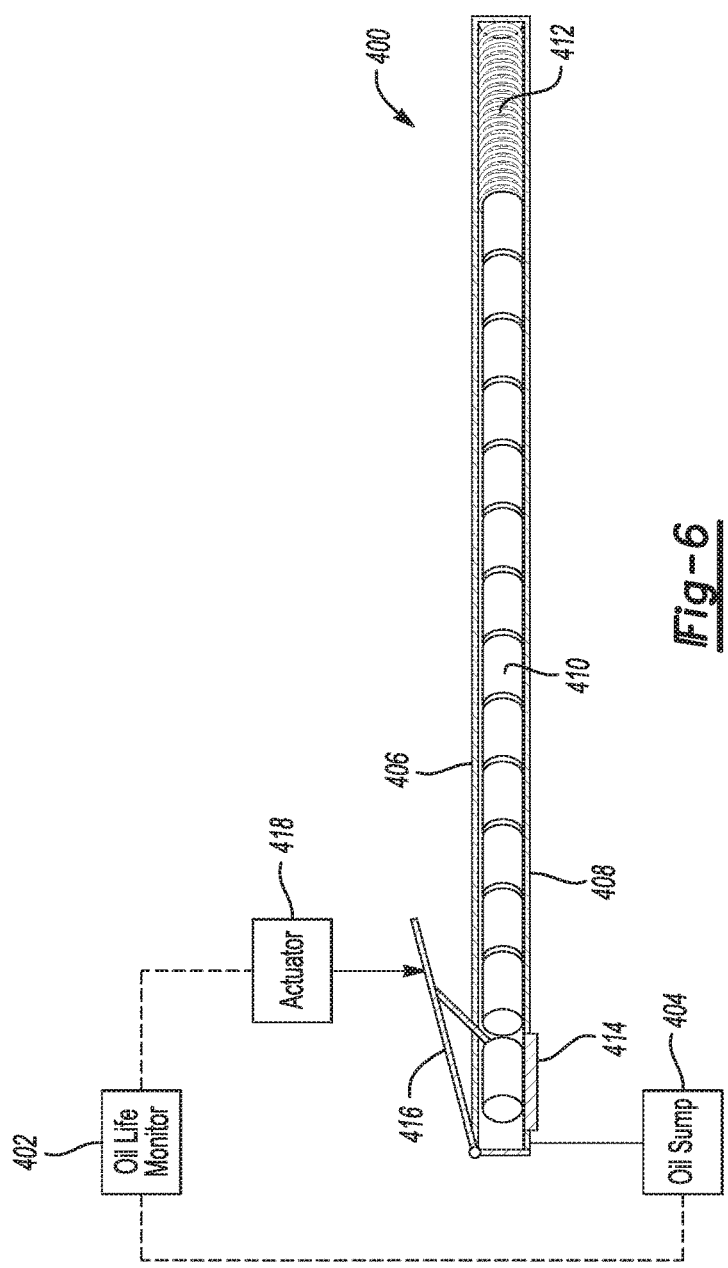
FIG. 6 is an exploded view of a lubrication additive material distribution system according to a fifth example.

Referring to FIG. 6, a dispensing system 400 is arranged to provide one or more additive materials over the course of the life of the vehicle without the need for a user to insert the material. An oil life monitor 402 may track a duration, or time in service, since a preceding oil change or additive material release. Alternatively, the oil life monitor 402 may detect one or more physical attributes of the lubricant based on sensing a chemical condition of the lubricant. In the example of FIG. 6, the oil life monitor 402 is in communication with a portion of the lubrication circulation system to gather data about the state of the lubricant. The oil life monitor 402 receives a signal from a sensor 404 disposed along a portion of the lubrication circulation loop. In the example of FIG. 6, the sensor 404 may be disposed at a sump portion of the engine. The sensor 404 may output a signal indicative of a level of contaminants present in the lubricant within the sump. The oil life monitor may store threshold values which when exceeded indicate a need for a release of additive material to condition the lubricant. The oil life monitor 402 may be further configured to issue command signals to operate the dispensing system 400 based on one or more lubricant attribute. In further examples, the oil life monitor is programmed to vary a volume of additive material ejected from the cartridge. Specifically, the dispensing system may determine a quantity of additive material sections to be ejected from the cartridge 408 based on operating conditions of the engine.

The dispensing system 400 includes an additive release mechanism 406 arranged to automatically release friction modifier into the oil circulation system. The release mechanism 406 includes a cartridge 408 shaped to house a series of additive material sections 410. In one example, the additive material sections comprise slow release pellets that dissolve in the lubricant releasing chemical additives over time. The additive release mechanism 406 also includes a spring member 412 arranged to bias the additive material sections 410 towards a release opening 414. A release lever 416 is arranged to selectively retain the additive material sections 410 within the cartridge 408 until a determined time for staging and release into the oil circulation system.

An actuator 418 is arranged to actuate the release lever 416 to allow a dispensing of the next section of a series of additive material sections 410. In some examples the actuator 418 is a solenoid that is activated in response to a command signal from the oil life monitor 402. Actuation of the release lever 416 pushes the next one of the plurality of additive material sections out of the cartridge 408. Each time an additive material section is ejected, the force from the spring element 412 indexes the series of additive material sections 410 to push the next section into position for a subsequent additive material release. The release opening 414 is in fluid connection with the oil sump 404 such that when the next additive material sections 410 is dispensed, it comes into contact with the bulk oil circulating through the engine. The dispensing location includes a strategic placement that allows additive material to be deposited into the oil pan.

A sufficient number of additive material sections are provided within the cartridge 408 to supply additive material over the service life of the engine. For example, about 40 additive sections may be provided with the vehicle such that if a new section of additive material is dispersed every 6,000 miles, a service life of 240,000 miles may be covered by the initial supply of sections 410. According to one example. In alternative examples, the cartridge may be replenished after a period of time and/or once all of the additive sections are used. Further, a different type of additive material may replace a previous type to change the chemical composition of the particular additive supplied to the lubrication circulation system.

The additive release system is automated such that it does not require a technician to replenish lubricant additives. Further, the dispensing system 400 is arranged to dispense additives with standard oil filter configurations.

In some alternative embodiments, the cartridge 408 is loaded with a gel or fluid additive material within an inner cavity. A spring-loaded plunger may be configured to periodically advance through the cartridge as a result of force from spring element 412. Based on at least a dissolution rate of the engine oil additive, the oil life monitor 402 may periodically issue a signal to actuate the lever 416 to relieve a holding pressure allowing the plunger to advance and dispense a predetermined volume of additive material. A nozzle may be provided having an orifice in fluid flow communication with the bulk oil to distribute the additive material. Unlike solid additive material sections discussed in examples above, the plunger may be configured to push out a fluid material in a customized amount to provide a variable desired volume segments of additive material. In some examples, the oil life monitor 402 is programmed to calculate a volume of fluid additive material to be dispensed based on a measured quality of the engine oil (viscosity, contaminant percentage, etc.)

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A lubrication system in a machine comprising:
   a sump to collect a bulk portion of lubricant;
   a pump adapted to circulate the lubricant from the sump through a lubricant line to an area of the machine for lubrication;
   an oil filter disposed along the lubrication line adapted to filter the lubricant flowing through the lubricant line; and
   an additive fixture in fluid flow communication with the oil filter adapted to house at least one additive material section and distribute the additive material in a lubrication flow circulation;
   wherein the additive fixture is integrated into a lubricant dipstick of the machine, and
   wherein the additive material is replenishable independently from the oil filter.

2. The lubrication system of claim 1 wherein the additive fixture further comprises a mesh basket removably disposed within a housing of the oil filter, the mesh basket being sized to house a plurality of additive material sections.

3. The lubrication system of claim 1 wherein the additive fixture includes a first port in fluid connection with a lubricant passage of a cylinder block of the machine and a second port in fluid connection with an oil filter block of the machine.

4. The lubrication system of claim 1 wherein the additive fixture is disposed along an oil supply line downstream of the oil filter.

5. The lubrication system of claim 1 wherein the additive fixture includes an insertion port arranged to receive the at least one additive material section.

6. The lubrication system of claim 1 wherein the at least one additive material section includes at least one of a pellet, a fluid volume, a gel volume, a gel pack, a capsule, and a powder.

7. The lubrication system of claim 1 wherein the additive fixture includes an internal cavity having a swirl chamber to circulate lubricant fluid flow about the at least one additive material segment.

8. A method of dispensing additive material to a lubricant comprising:
   circulating a lubricant through a machine;
   providing a lubricant filter in a lubricant fluid circuit to filter a contaminant from the lubricant;

providing an additive fixture along the lubricant fluid circuit to distribute an additive material to modify a chemical property of the lubricant, wherein the additive fixture is integrated into a lubricant dipstick having a portion disposed in an oil sump of the machine, and wherein the additive material is replenishable independently from the oil filter;

monitoring at least one lubricant property; and in response to the lubricant property exceeding a predetermined threshold, generating a signal indicative of a need to replenish the additive material.

9. The method of claim 8 the additive material is at least one of a friction modifier, an antioxidant, and an antifoamant agent.

10. The method of claim 8 further comprising replacing the additive fixture with a second additive fixture having replenished additive materials.

11. The method of claim 8 inserting additive material into an internal cavity of the additive fixture.

12. The method of claim 8 wherein the additive fixture comprises a mesh basket disposed within the lubricant filter.

13. The method of claim 8 wherein the additive fixture is disposed along a lubricant supply line downstream of the lubricant filter.

14. An engine for a motor vehicle comprising:
at least one combustion cylinder within a cylinder block;
a reciprocating piston arranged to cycle within each of the combustion cylinders to generate an engine torque;
a lubrication system arranged to circulate a lubricant about components of the cylinder block;
an oil filter in fluid flow communication with the lubrication system; and
an additive fixture integrated into a lubricant dipstick and disposed between the oil filter and the lubrication system, wherein the additive fixture houses at least one additive material section in contact with a lubricant flow;
wherein the additive material is replenishable independently from the oil filter; and
wherein the lubricant dipstick includes a handle portion, a middle portion, and a lower portion, wherein the lower portion extends to an oil sump portion of the engine.

15. The engine of claim 14 wherein the additive fixture includes a first port in fluid connection with a fluid passage of the cylinder block, and a second port in fluid connection with the oil filter.

16. The engine of claim 14 wherein the additive fixture is disposed along an oil supply line downstream of the oil filter.

17. The engine of claim 14 wherein the additive fixture includes an insertion port arranged to receive the at least one additive material section.

18. The engine of claim 14 wherein the at least one additive material section includes at least one of a pellet, a fluid volume, a gel volume, a gel pack, a capsule, and a powder.

19. The engine of claim 14 wherein the additive fixture includes an internal cavity having swirl chamber to circulate lubricant fluid flow about the at least one additive material section.

* * * * *